Patented Apr. 15, 1941                                                          2,238,671

UNITED STATES PATENT OFFICE 2,238,671

METHOD OF TREATING WELLS

John C. Woodhouse, Cragmere, Del., assignor to E. I. du Pont de Nemours & Company, Wilmington, Del., a corporation of Delaware No Drawing. Application February 9, 1940, Serial No. 318,100

13 Claims. (Cl. 166—21)

This invention relates to a method of treating wells such as oil, gas and water wells to increase or restore production. More particularly this invention relates to such a method involving introduction of substances into the well cavity for increasing fluid output of oil and gas wells.

Various proposals have previously been made for increasing the production of wells but usually such proposals have involved methods for breaking down and disintegrating mineral matter in the form of rock structure or the cement sheath of the well walls. To accomplish this result it has generally been believed that inorganic acids are necessary for effective disintegration of the mineral or inorganic matter of which the rock structure is predominantly formed. Organic acids have also been proposed for this purpose, particularly however for disintegration or dissolving of cement used in surrounding the well casing.

Inasmuch as metallic materials of construction ordinarily are used extensively in wells, the use of the acid proposed, particularly the inorganic acids, has given rise to quite extensive corrosion with resultant lasting damage to the metal parts. This corrosion is especially serious because of the impossibility of economical repair of the well casing which often extends to great depths under the surface of the earth.

It is, accordingly, an object of this invention to overcome the disadvantages of the prior art, including these hereinbefore outlined, and to provide a new and improved method for treating wells.

A further object of this invention is to provide an improved method for increasing the fluid flow from oil wells.

Other objects and advantages of this invention will be apparent from the following specification.

According to this invention treatment of wells such as oil, gas and water wells is accomplished by introducing into such wells one or more of the readily hydrolyzable amides, esters, or salts of the lower fatty acids, or such acids containing a substituent group as hydroxy, acyloxy and alkoxy. Such acids include formic, acetic, hydroxy acetic, polyhydroxy acetic, and methoxyacetic. Thus, there may be used specific substances coming under these broader headings such as: methyl formate and the formates of the alcohols boiling above methanol obtained in the high pressure catalytic hydrogenation of oxide of carbon; methyl acetate; methyl hydroxyacetate; methyl polyhydroxy acetate; methyl methoxy acetate; ethyl propionate; polyglycolide; formamide; acetamide; hydroxy acetamide; methoxy acetamide; diglycolyl urea; isobutyoxy acetamide; ammonium salts of formic, acetic, hydroxyacetic, methoxyacetic, acetoxyacetic and polyhydroxyacetic acids.

In practicing this invention the treating or "acidizing" substances may be introduced into the well in the customary manner, using pressure if desired to drive the "acidizing" material into the well and surrounding formation. The materials of this invention may also be placed in solution, preferably aqueous solution, before introduction into the well or introduced into the well and solution thereafter accomplished. One of the features of the invention resides, however, in the fact that the pure or concentrated "acidizing" substances as such have relatively little or no corrosive effect upon ferrous materials and hence their introduction into the well followed by subsequent effecting of solution is preferred. This is so because after aqueous solution is effected there may occasionally arise conditions, in handling the solutions, under which hydrolysis of the "acidizing" agents causes slight corrosion.

The concentration of solutions of readily hydrolyzable materials may vary over a wide range such, for example, as from 0.5 to 20.0% concentration. They are quite effective in the lower ranges and, for reasons of economy, these lower concentrations are preferred, i. e. in concentrations of the order of 0.5 to 5.0%.

Variations may be made in the details and preferred embodiments of this invention without departing therefrom or sacrificing the advantages thereof. Thus, for example, after treatment of a well for a desired length of time it may be of advantage for further penetration and disintegration of the formation surrounding the well proper to remove the at least partially spent acidizing solution and to repeat the treatment with fresh materials.

I claim:

1. A method of treating a well and increasing production thereof which comprises introducing into a well a readily hydrolyzable substance selected from the group consisting of the amides, esters, and salts of a lower fatty acid and the amides, esters and salts of hydroxy group-, acyloxy group-, and alkoxy group-containing lower fatty acids.

2. A method of treating a well and increasing production thereof which comprises introducing under pressure into a well a readily hydrolyzable substance selected from the group consisting of the amides, esters, and salts of a lower fatty acid and the amides, esters and salts of hydroxy group-, acyloxy group-, and alkoxy group-containing lower fatty acids.

3. A method of treating a well and increasing production thereof which comprises introducing into a well a readily hydrolyzable substance selected from the group consisting of the amides, esters, and salts of a lower fatty acid and the amides, esters and salts of hydroxy group-, acyloxy group-, and alkoxy group-containing lower fatty acids.

4. A method of treating a well and increasing production thereof which comprises introducing into a well an aqueous solution of a readily hydrolyzable substance selected from the group consisting of the amides, esters, and salts of a lower fatty acid and the amides, esters and salts of hydroxy group-, acyloxy group-, and alkoxy group-containing lower fatty acids.

5. A method of treating a well and increasing production thereof which comprises introducing under pressure into a well an aqueous solution of a readily hydrolyzable substance selected from the group consisting of the amides, esters, and salts of a lower fatty acid and the amides, esters and salts of hydroxy group-, acyloxy group-, and alkoxy group-containing lower fatty acids.

6. A method of treating a well and increasing production thereof which comprises introducing under pressure into a well an aqueous solution of a readily hydrolyzable substance selected from the group consisting of the amides, esters, and salts of a lower fatty acid and the amides, esters and salts of hydroxy group-, acyloxy group-, and alkoxy group-containing lower fatty acids.

7. A method of treating a well and increasing production thereof which comprises introducing into the well methyl formate.

8. A method of treating a well and increasing production thereof which comprises introducing into the well an aqueous solution of methyl formate of a concentration of from 0.5 to 20.0%.

9. A method of treating a well and increasing production thereof which comprises introducing into the well an aqueous solution of methyl formate of a concentration of from 0.5 to 5.0%.

10. A method of treating a well and increasing production thereof which comprises introducing into the well methyl acetate.

11. A method of treating a well and increasing production thereof which comprises introducing into the well an aqueous solution of methyl acetate of a concentration of from 0.5 to 20.0%.

12. A method of treating a well and increasing production thereof which comprises introducing into the well methyl hydroxy acetate.

13. A method of treating a well and increasing production thereof which comprises introducing into the well an aqueous solution of methyl hydroxy acetate of a concentration of from 0.5 to 20.0%.

JOHN C. WOODHOUSE.